March 24, 1959     L. C. BANKER     2,878,958
ICE CREAM CONTAINER RACK
Filed Feb. 16, 1955
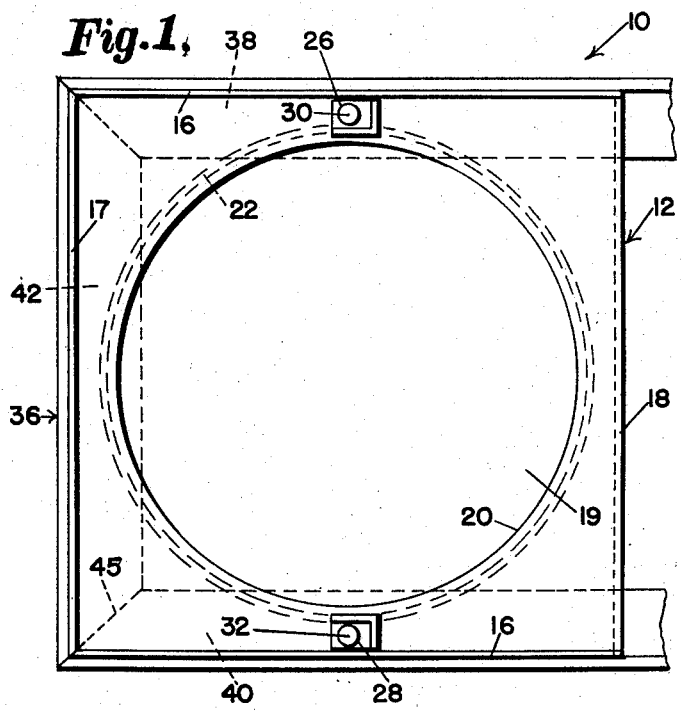
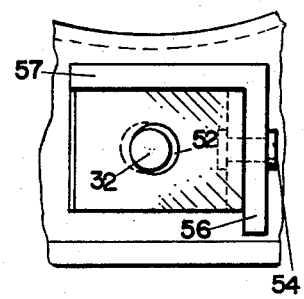
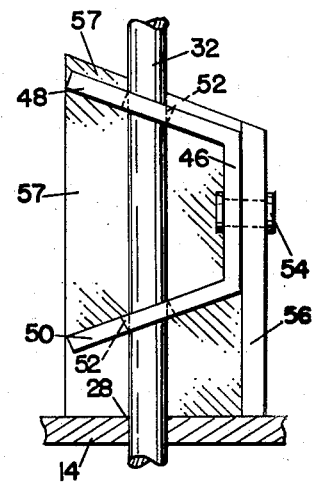
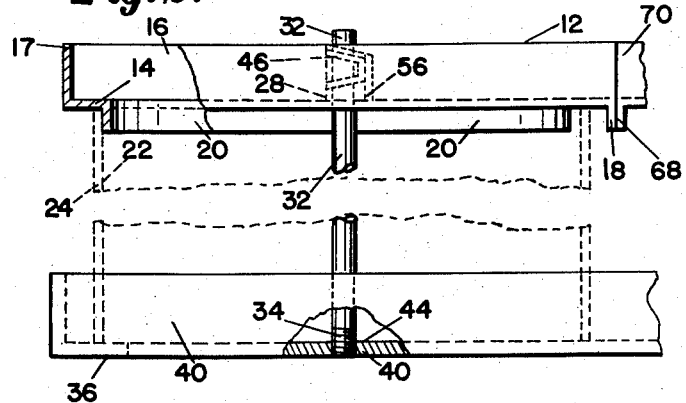
INVENTOR.
L. C. Banker
BY Arthur H. Sturges.
Attorney

United States Patent Office 2,878,958
Patented Mar. 24, 1959

2,878,958
ICE CREAM CONTAINER RACK
Louis C. Banker, Britt, Iowa
Application February 16, 1955, Serial No. 488,642
1 Claim. (Cl. 220—85)

The instant invention relates to the art of dispensing ice cream from comparatively large containers, and more particularly from 10-gallon as well as 5-gallon containers such as are employed at the refreshment counters of ice cream parlors, drugstores, and the like, where ice cream is scooped from the said containers preparatory to serving a dish or cone of ice cream to a customer, and more particularly to a rack adapted to be positioned in a refrigerating compartment in the said counter.

It is an object of the invention to provide a means for not only holding the said container stationary during a scooping of ice cream therefrom, but also to provide a tray or guard clamped to the open end of the container and in a manner whereby any ice cream which becomes spilled from the scoop employed may be readily returned to the container in lieu of dripping or being spilled on the outer surface or container or onto the floor of the bottom of the counter or cabinet in which the container is positioned.

Another object of the invention is to provide a device which will not only accommodate containers of different capacity, but will also permit an operator to employ one hand for removal of ice cream from the container with a scoop, but will also permit the operator to simultaneously hold an ice cream cone or dish in his other hand whereby time and labor is conserved.

A further object of the invention is to provide a device having hold-down rods, the ends of which may be threadedly attached to the base thereof at desired times, and which may be secured to the floor of the container without the employment of said base at other times, as may be desired.

Other and further objects and advantages of the invention will be understood from the following detailed description thereof.

In the drawings:

Figure 1 is a top plan view of the new device, certain portions of the base frame thereof being broken away, and the open end of an ice cream container being represented by broken lines.

Figure 2 is a side elevation of the parts depicted in Figure 1, a certain portion of a tray or guard employed being broken away for showing a side portion of the tray in section.

Figure 3 is a top plan view of a resilient hold-down clamp employed, and certain fragments of the said guard.

Figure 4 is a side elevation of the clamp and adjunct parts shown in Figure 3.

Figure 5 is a semi-diagrammatic view depicting in longitudinal section a refrigerating compartment having removable lids and showing therein representations of 5-gallon and 10-gallon ice cream containers, together with the new device applied thereto in a position of use.

It is well known that during a removal of ice cream from a container by means of a scoop and from a large container disposed in a refrigerator compartment such as is employed at the refreshment counter of a drugstore or the like, the containers slide and turn upon the floor of the compartment since the ice cream is comparatively hard and the operator must fill the said scoop by means of forcible engagement of the edge of the scoop with the frozen cream, whereby as heretofore practiced, the operator has been required to prevent said movement of a container with one hand while scooping ice cream with his other hand. Also, said sliding and turning of a container is hard to prevent, especially at times when 5-gallon containers are stacked one upon another, and the instant invention aims to obviate the difficulties of the prior practice by providing a device for maintaining said containers stationary during a dispensing of ice cream from the latter.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, and 12 indicates a guard employed.

As best shown in Figure 2, the guard 12 includes a portion 14 which is horizontally disposed in use, having three upwardly disposed flanges. The flanges 16 are disposed at the sides of the guard, and a flange 17 at one end thereof. At that side or end of the guard 12 which is oppositely disposed with respect to the flange 17, the guard is provided with a downwardly disposed flange 18, for purposes later described.

The guard is provided with a medially disposed aperture 19, which is of less diameter than the diameter of the wall of an ice cream container with which the new device is employed, said container being of a diameter conventionally employed by ice cream factories, usually being formed of sheet metal.

The guard 12 includes a circular flange 20 disposed at the perimeter of said aperture. The flange 20, during use, extends downwardly from the horizontal portion 14 of the guard and into the mouth of the ice cream container disposed there below. Preferably the flange fits snugly against the inner annular wall 22 of the container 24, said wall and container being represented by broken lines in Figures 1 and 2.

At opposite sides of the guard and adjacent the side flanges 16 thereof respectively, the guard is provided with two apertures or holes 26 and 28 disposed therethrough, through which the rods 30 and 32 extend respectively, during use.

The rods 30 and 32 are disposed vertically during said use, the upper ends thereof being plain, and the lower ends provided with screw threads 34, respectively, for purposes later described. Although the holding elements are described as rods it will be understood that holding elements of other types and designs may be used.

The new device further includes a base frame 36 which may be employed at times in lieu of floor flanges or the like, the latter not being shown, and for purposes later described.

The base frame is generally indicated at 36, and is preferably formed primarily of angle iron having base flanges with vertically disposed webs. The side rails 38 and 40 of the base frame are joined together at the ends thereof by further angle irons 42 and 43. The end rail 42 is best shown in Figure 1, and the end rail 43 represented in Figure 5 only. The base frame provides an elongated rectangular configuration in plan, and is adapted to be positioned upon the bottom of the later-described compartment or cooler 58.

As best shown in Figure 2, the horizontally disposed arm of the side rail 40 is provided with an aperture 44, the wall of which is provided with a screw thread complemental to the thread 34 of the rod 32, and it will be understood that the oppositely disposed rail 38 is similarly adapted to be attached to the threaded end of the rod 30. At times when the base is not employed, threaded floor flanges may be secured to the base of the container 58, and the vertically disposed rods 30 and 32 may be threadedly secured thereto.

As best shown in Figure 1, the ends of the angle irons of the base are mitered and are abutted prior to welding them together as indicated at 45 by means of broken lines and as best shown in Figure 2. One arm of each of the angle irons is horizontally disposed and their other arms are vertically disposed during use.

During use, the annular flange 20 is disposed within the mouth of the container 24 as heretofore described, and means are provided on the upper ends of the rods for maintaining the circular flange within said mouth at desired times. The preferred means is a clamp, now to be described, for each rod. Since said clamps are of like construction with respect to each other, but one thereof is minutely described herein. Referring to Figure 4, the clamp 46 is formed of resilient sheet metal material, bent to provide diverging spring plates forming oppositely disposed grippers 48 and 50 which extend from the main body portion thereof. The said grippers are provided with like apertures 52, said apertures being of a larger bore than the diameter of the rods 30 and 32, for loosely receiving said rods therethrough, as best shown in Figure 3. The inherent resiliency of the clamp 46 causes the free ends of said grippers to normally be urged away from each other for purposes later described. The main body portion of the clamp is secured by any suitable means, such as the rivet 54, to a stop 56, the lower or free end of which causes said grippers to be spaced from the upper surface of the horizontal portion 14 of the guard 12 sufficiently to permit the operator to apply his thumb and forefinger, respectively, to the grippers 48 and 50, for moving them toward each other and permitting the clamp to slide on the rod for purposes later described. At times when the operator releases the said grippers, the latter return to a normal condition and into engagement with the rod for locking the clamp to said rod, as shown in Figure 4, thereby maintaining the sleeve 20 disposed in the open end or mouth of the container 24.

As best shown in Figure 3, the stop member 56 is L-shaped in plan, the arm 57 thereof being disposed inwardly and confrontingly with respect to its oppositely disposed mate at the other side of the container, whereby said arm provides a shield or guard whereby the knuckles or fingers of an operator are prevented from coming in contact with the grippers of the clamp during a scooping of ice cream from the container 24.

Referring to Figure 5, adjacent the ice cream container 24 two like containers of lesser capacity are indicated at 60 and 62, being stacked within the refrigerated compartment or cooler 58. Above the container 24 a removable cover 64 is provided, and a like cover 66 serves the container 60.

The compartment 58, as shown, is of sufficient length to serve further ice cream containers having different flavors of ice cream therein. In operation, the operator, while holding a scoop in one hand and a dish or edible cone in his other hand, subsequent to a removal of the cover 64, removes ice cream from the container 24 by means of the scoop and deposits the ice cream in said cone or dish, this being permitted since the container 24 is held stationary by means of the new device. Similarly, ice cream is served from the container 60 until the latter is empty, whereupon the container 60, together with its guard 12, is removed. The cover for the container 62 is then removed, whereupon the said guard is applied to the container 62 for maintaining the latter stationary in conjunction with the resilient grippers and their adjunct parts.

As best shown in Figure 2, the downwardly disposed flange 18 of the guard 12 is abutted against the next-adjacent like flange 68 of the further guard 70 employed, whereby the guards 12 and 70 may be moved independently of each other.

Among other advantages of the invention it will be seen that the guard 12 not only serves to maintain the container 24 stationary, but also is of advantage since any ice cream spilled upon the horizontal portion 14 thereof during a removal of ice cream from the container 24, which lodges upon said horizontal portion, may be scraped or moved back into the container 24 by the operator.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore a more lengthy description is regarded as unnecessary.

Changes in shape, size, and rearrangement of details and parts such as come within the purview of the invention claimed may be resorted to in actual practice, if desired.

I claim:

In an ice cream container rack, the combination which comprises a rectangular-shaped horizontally disposed base frame including side and end rails, L-shaped in cross section, having horizontally positioned base flanges and vertically disposed webs extended from outer edges of the base flanges, spaced pairs of rods mounted in and extended upwardly from the base flanges of the rails, the base flanges of the rails being positioned to receive ice cream containers, a horizontally disposed plate having a circular opening therein with a depending flange extended around the opening designed to be positioned on the upper end of an ice cream container positioned on the base flanges of the base frame providing a guard around the upper edge of an ice cream container with the depending flange extended into the upper edge of the container, the plate having upwardly extended flanges on three sides and a depending flange on the fourth side, the fourth side being positioned to be in meeting relation with the guard of another ice cream container, said plate having openings in opposite sides and the openings being positioned to receive the vertically disposed rods extended from the base flange of the base frame, and spring gripping clamps having diverging arms with openings therein mounted on the plate and positioned whereby the vertically disposed rods extend through the openings of the arms and are gripped by edges of said openings.

References Cited in the file of this patent

UNITED STATES PATENTS

| | | |
|---|---|---|
| 696,832 | Maschke | Apr. 1, 1902 |
| 820,306 | Holle | May 8, 1906 |
| 860,816 | Marcum | July 23, 1907 |
| 925,876 | Davis | June 22, 1909 |
| 969,879 | Karlson | Sept. 13, 1910 |
| 1,115,656 | Fritschle | Dec. 3, 1914 |
| 1,659,333 | Roberts | Feb. 14, 1928 |
| 1,667,114 | Hooker | Apr. 24, 1928 |
| 2,298,577 | McPhail | Oct. 13, 1942 |
| 2,615,578 | Mankki | Oct. 28, 1952 |
| 2,740,546 | Kowalski | Apr. 3, 1956 |